T. J. McCOY.
GLASS MANUFACTURE.
APPLICATION FILED OCT. 4, 1911.

1,246,764.

Patented Nov. 13, 1917.
3 SHEETS—SHEET 1.

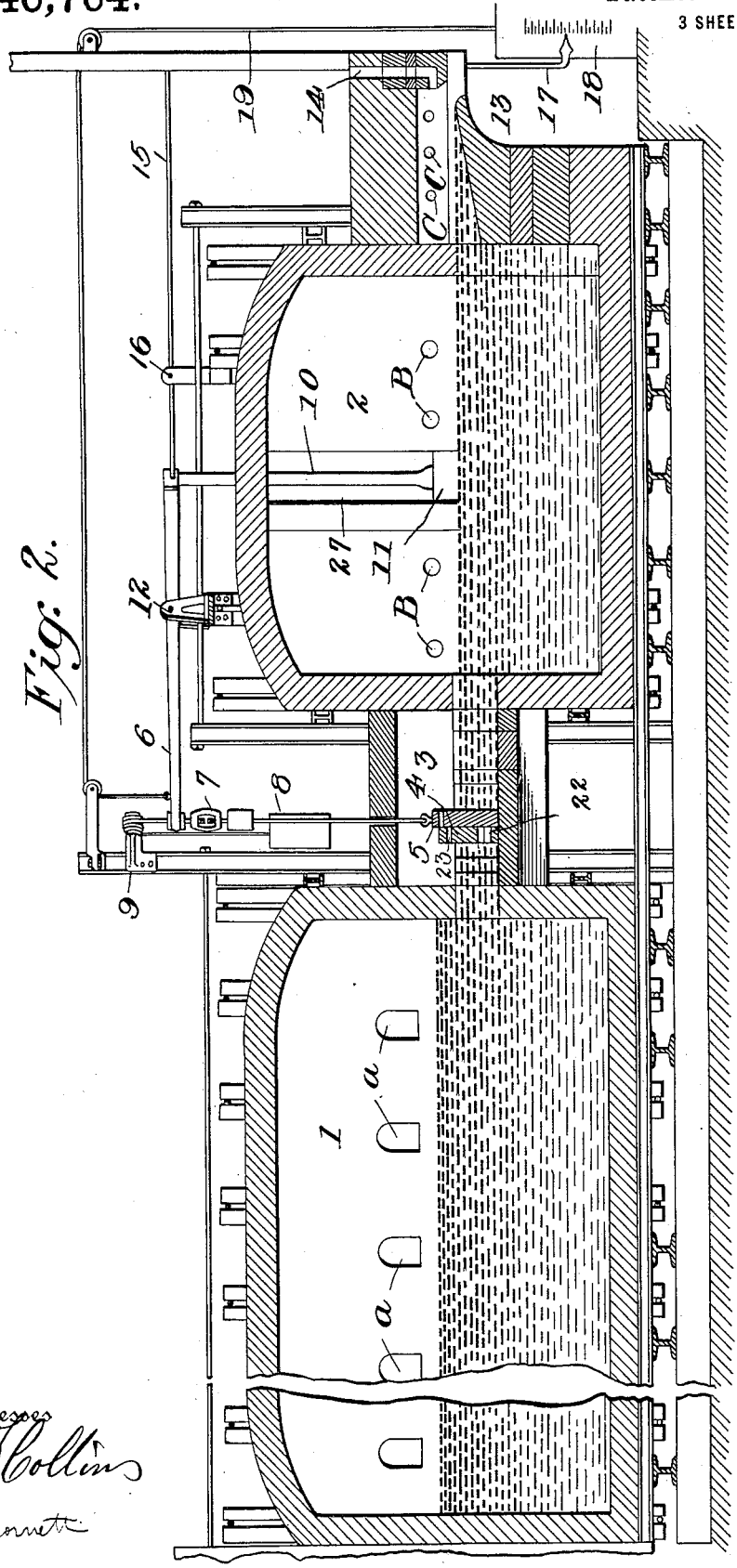

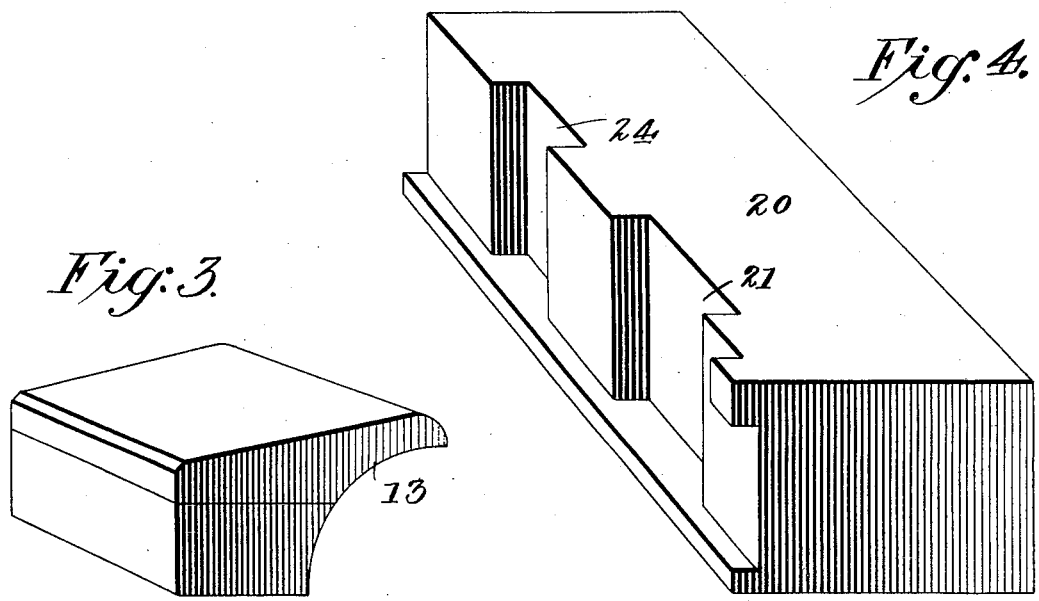
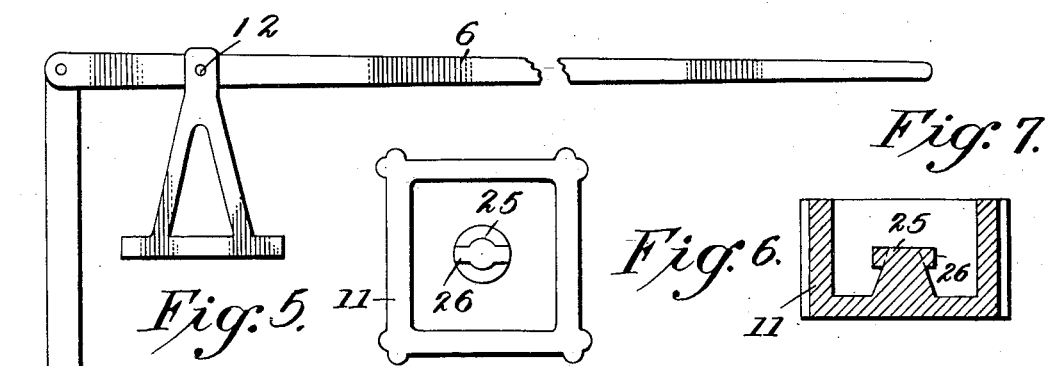
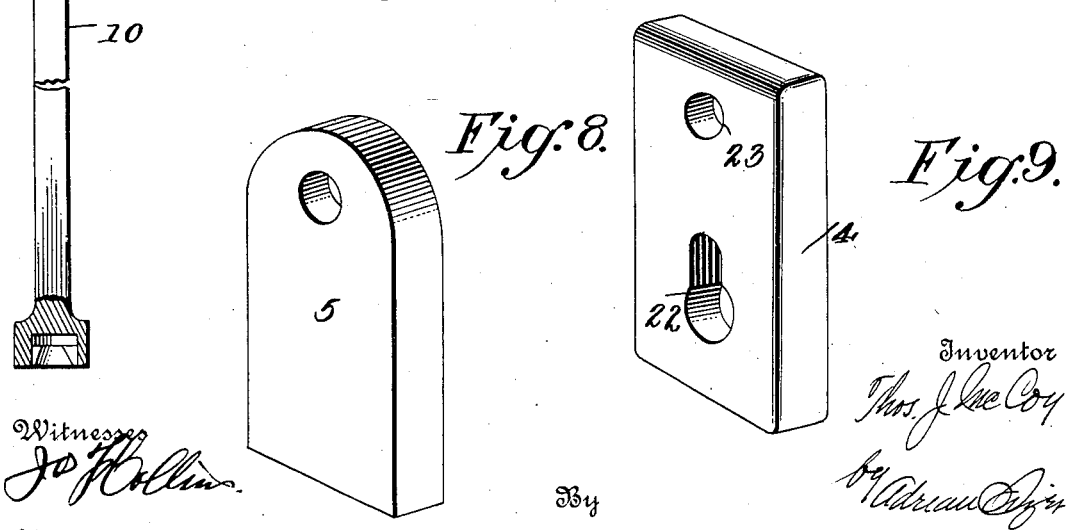

UNITED STATES PATENT OFFICE.

THOMAS J. McCOY, OF KANE, PENNSYLVANIA.

GLASS MANUFACTURE.

1,246,764.  Specification of Letters Patent.  Patented Nov. 13, 1917.

Original application filed May 18, 1911, Serial No. 627,923. Divided and this application filed October 4, 1911. Serial No. 652,780.

*To all whom it may concern:*

Be it known that I, THOMAS J. MCCOY, a citizen of the United States, residing at Kane, in the county of McKean and State of Penna., have invented certain new and useful Improvements in Glass Manufacture, of which the following is a specification.

This invention relates to a novel form of apparatus for the production of glass, and is more particularly applied to the production of sheet glass.

The present application is a division of an application for Letters Patent of the United States filed by me on May 18, 1911, for process and apparatus for making sheet glass, serially numbered 627,923.

The primary object of this invention is to dispense with as far as possible the use of manual labor, and to substitute therefor, mechanism which will do the work more economically by a greater saving of time and material, than can be done by the various methods now in common use, and to bring into use mechanism and process by which glass may be produced in sheet form, of substantial uniform thickness, without having to undergo the various stops of cutting, flattening, and annealing, at intermittent periods, as is now the common practice.

I have found that the above may be accomplished by flowing or pouring the glass from a flat spout or apron of novel construction upon a suitable supporting conveyer.

By my improved process of flowing the glass from the apron of the supply tank, I acquire advantages not possessed by other methods, wherein the glass in its cooling stages is subjected to internal strain, causing a greater liability to fracture than when produced by my improved method of production.

In my process the sheet emerges by gravity from the mass of molten metal, from what is virtually a shallow body formed by flowing the glass over an inclined surface, gradually diminishing the thickness, until the glass flows out in proper thickness to form commercial sheet glass.

Another feature of my invention is providing a form of apparatus by which the supply of glass from which the sheets are formed, can be maintained at a uniform temperature, and a continuous uniform supply maintained, by reason of an improved form of reduction furnace and supply tank, and the combination of the same in glass producing means.

Another feature of my invention is to provide means whereby the temperature of the glass may be regulated at the point of discharge in its passage over the apron, in that proper fluidity may be maintained and at the same time allowing the glass to approach the congealing stage sufficiently to maintain a continuous sheet formation.

Another object of my invention is to avoid the necessity of using "baits" or other forms of adhesive means, by which to "draw" the glass, the advantages of which are most important in keeping the molten glass free from foreign matter, such as scales and other particles of iron, from "blow pipes" and other "baits" such matter tending to interfere with the uniformity and clearness of the glass.

My invention further consists in the novel construction and arrangement of parts herein described and more particularly pointed out in the accompanying claims.

In order to more fully describe my said invention reference will be had to the accompanying drawings wherein:

Fig. 2, is a fragmentary sectional view of said apparatus, showing the melting tank and supply tank.

Fig. 3, is a perspective of the flowing apron or spout located in the discharge end of the tank, shown in Fig. 2.

Fig. 4, is a detail perspective view in half section of the flume shown in Figs. 1, and 2.

Fig. 5, is a detailed view of the lever mechanism for controlling the flow of glass into the supply tank.

Figs. 6 and 7, are detail views of the float operating the lever mechanism shown in Fig. 5.

Figure 1:
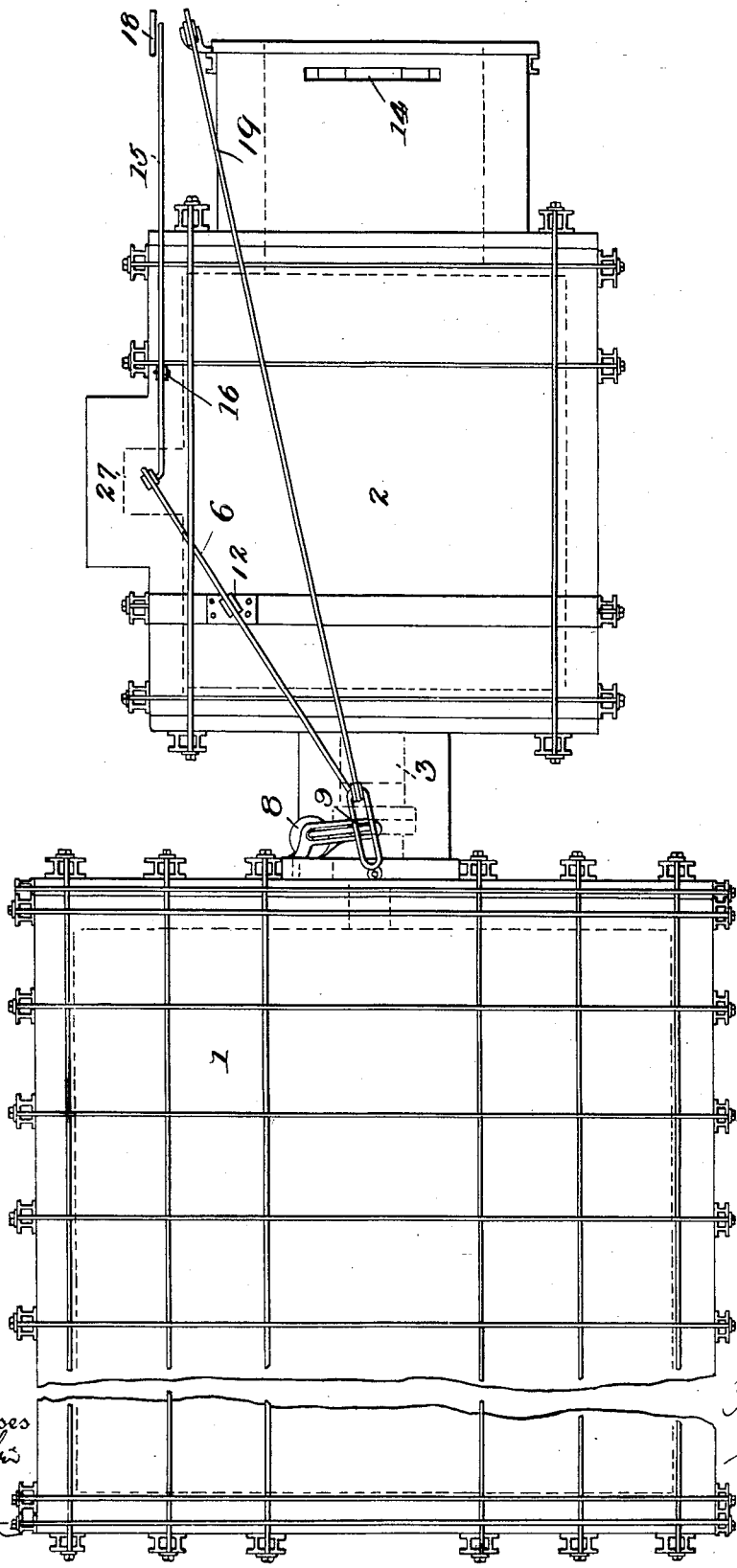
Figure 1, is a detail top plan view of the tank staying, showing the lever mechanism for controlling flow of glass.

Figs. 8, and 9, are detail perspective views of the gate blocks controlling the flow of glass through the flume in Fig. 2.

Referring to the accompanying drawings (Fig. 2) 1 represents the melting tank of a glass furnace of novel construction, wherein the ingredients which make up the molten glass are melted and reduced to a fluid state, 2 represents a supply tank which receives its supply of glass through a horizontal flume 3, communicating with the reduction tank 1. Located within the flume 3, is placed a gate block 4, with an aperture therethrough for governing the degree of flow of glass through the flume 3. Between the block 4 and the melting tank located in the flume is a movable gate block 5, operatively suspended from the fulcrumed lever 6, with intermediate regulating means consisting of turn buckle 7, located between the lever 6, and the gate block 5. To add relief to the suspended weight on the end of lever 6, counter weights 8, are operatively mounted on a cable passing over the sheave mounted on bracket 9.

Gas for melting the glass is admitted through the ports $a$—$a$ on each side of the reduction tank, and is similarly admitted by the ports B—B in the supply tank 2, for the purpose of maintaining a uniform fluidity of the molten glass. The heat in the chamber 2, is continuous and is supplied by the introduction of gas through the side ports and the supply regulated by suitable regulating devices. The melting tank is filled with molten glass to the level shown in Fig. 2, and the supply tank is filled to a somewhat lower level, this level being controlled by the position of the movable gate block 5.

Attached to the opposite end of the fulcrumed lever 6, is a connecting rod 10, passing down into the supply tank 2, and suitably coupled with a floater 11, composed of refractory material which is partially submerged in the glass in the supply tank 2. The lever 6, being fulcrumed at 12, the glass rising in the supply tank 2, causes the floater 11, to rise therewith, creating a downward movement of the gate block 5, thus reducing the volume of the flow of glass, from the reduction tank 1, to the supply tank 2, and the level of the glass in the supply tank 2, is thereby automatically maintained at a uniform level.

At the end of the supply tank opposite to the flume, is provided at flat spout or apron 13, over which the glass is flowed as will be described more in detail later. This apron 13 forms the lower wall of a discharge chamber 13'. Located above the apron 13, is a crowned covering of refractory material, leading from the space above the apron 13, is a flue 14, of novel construction, the purposes of which will be hereafter more fully explained.

For the purpose of enabling the operator to ascertain the status of the flow of the glass over the apron, and the thickness thereof as determined by the depth of the glass in the supply tank, I provide a suitable indicator comprising as shown in Fig. 2. a lever 15, fulcrumed at 16 the operative end of which is connected to the pivot joint of the rod 10, the opposite end of lever 15 being connected to the indicator 17, with its indicator hand arranged to register on the board 18 the relative depth of the level of the glass in the supply tank 2.

To further aid the operator in varying or increasing the flow of glass as may be desired, I provide means whereby the gate 5, in the flume 3, may be operated from a point within the observation of the indicator by the operator, by providing a suitable hand pull 19, operatively connected with the gate suspending means by attachment to lever 6, thus enabling the operator with the indicator in view, to raise the gate 5, thereby allowing a greater flow of glass from the reduction tank to pass through the flume 3, into the supply tank 2.

To provide for regulating the temperature within the flowing zone, so as to maintain a proper consistency to the glass as it passes over the apron 13, I provide suitable auxiliary heaters introduced through the ports C C (Fig. 2) placed above the point of flow from the supply tank, and regulated by suitable means. Above the flowing zone and communicating therewith, I provide a flue 14, extending upward to any height required for the purposes desired. This flue acts with the auxiliary heaters as controlling means for the regulation of the heat within the flowing zone. As the flow of fuel through the auxiliary burners is lessened, causing a corresponding reduction of heat in the flowing zone, the natural draft through the flue 14, causes an inflow of cooler air through the ports C C into the flowing zone, reducing the temperature therein, and providing a corresponding reduction of the temperature to the glass above the apron 13.

Referring to Fig. 4, 20 indicates a half section of a flume block composed of refractory material, comprising the flume 3 shown in Fig. 2 which by its construction permits of varying the flow of glass therethrough, by the operation of the gate block 5 (Fig. 8) composed of refractory material, operating in the slot 21 into which is also fitted the slab 4, (Fig. 9) through which is the opening 22 for the free passage of the molten glass. Placed in the upper end of the slab 4, is an aperture 23 by which the slab 4 may be removed. Located in the flume blocks 20 (Fig. 4) is placed another slot 24 into which may be placed an independent refractory slab for the purpose of shutting off entirely the molten glass from the melting tank, in case it is desired to make repairs to the gate block 5, or its operating mechanism.

Referring to Figs. 5, 6 and 7, 11 is a float of refractory material adapted to engage the end of the rod 10 by detachable means. In the particular form herein shown, the end of the rod, 10 is recessed to receive the stud 25 which has an elongated head 26 engaging a correspondingly shaped slot in the recessed shoulder of the end of rod. By turning the rod 10 one quarter turn, the attachment is secured. As the floater 11 as shown in Figs. 6 and 7 is of rectangular formation, and moves in a similar shaped shaft 27 (Fig. 1) disengagement can not be had between the rod and the floater 11 without turning the rod 10.

Another advantage possessed by the present invention is the flowing of glass directly out of a main supply tank of substantial proportions, permitting a uniformity of fluidity of the molten glass not generally acquired by other methods. This invention dispenses with the many mechanical accessories required in drawing sheet glass where the use of baits with the usual elevating and operating machines are required, together with such other forms of apparatus as is required by which attempts are made to keep the sheet of glass from contracting and becoming narrower as the drawing operation proceeds. I do not limit myself to the specific form of apron shown, as other designs differentiating from the one shown may be employed without departing from the spirit of my invention.

Having thus described my invention what I claim as new and desire to obtain by Letters Patent is:

1. In a glass working apparatus, a melting tank, a second tank, a flume connecting the tanks, a discharge opening leading from the second tank, having an inclined lower wall, and having its outer portion at approximately the level to be maintained by the glass in the flume and in the second tank, and counterbalanced and automatically operated means for maintaining the glass level substantially uniform, guide blocks in the sides of the flume for guiding said means, and an apertured block located between the guide blocks and adjacent to said means.

2. In a glass working apparatus, a melting tank, a second tank connected therewith, and means for flowing glass from the second tank, including a discharge chamber having side walls provided with ports for the admission of heat, a lower wall inclined upwardly toward the outer portion, and a low heat deflecting upper wall projecting beyond the lower wall and having an air passage extending upwardly from a point approximately at the surface of the glass being discharged.

3. In a glass working apparatus, a melting tank, a second tank connected therewith, means for flowing glass from the second tank, including a discharge chamber having side walls provided with ports for the admission of heat, upper and lower walls projecting beyond the main portion of the front wall of the second tank, the upper wall of the chamber extending beyond the lower wall thereof, said lower wall being inclined, an air passage extending through the projecting portion of the upper wall and terminating in a portion projecting substantially horizontally into the chamber below the heating ports and above the discharge orifice of the chamber, and means for maintaining the glass level in the second tank slightly above the higher portion of the lower wall and below said ports and the terminus of the air passage.

4. In a glass working apparatus, a melting tank, a second tank connected therewith, means for flowing glass from the second tank including a discharge chamber having side walls provided with ports for the admission of heat, upper and lower walls projecting beyond the main portion of the front wall of the second tank, the upper wall of the chamber extending beyond the lower wall thereof, said lower wall being inclined, an air passage extending through the projecting portion of the upper wall and terminating in a portion projecting substantially horizontally into the chamber below the heating ports and above the discharge orifice of the chamber, and automatically operated means for maintaining the glass level in the second tank slightly above the higher portion of the lower wall.

5. In a glass working apparatus, a discharge tank including a stationary outlet portion having a lower wall constituting an apron inclined upwardly at its outer portion and positioned to normally carry a portion of the volume of glass in the tank, the portion so carried by the apron being of substantially the width of the glass to be drawn, said apron presenting a continuous plane of uniform inclination extending to the point of discharge.

6. In a glass working apparatus, a discharge tank including a stationary outlet portion having a lower wall constituting an apron inclined upwardly at its outer portion and positioned to normally carry a portion of the volume of glass in the tank, the portion so carried by the apron being of substantially the width of the glass to be drawn, said apron presenting a continuous plane of uniform inclination extending to the point of discharge, and means forming an air flue having an entrance portion located above the outer edge of the apron and extending in a direction opposite to the direction of flow of the glass.

In testimony whereof I have affixed my signature in presence of two witnesses.

THOMAS J. McCOY.

Witnesses:
FREDERICK KIME,
JOHN D. HARRE.